United States Patent
Owen et al.

[11] Patent Number: 6,056,431
[45] Date of Patent: May 2, 2000

[54] MODIFIED PASSIVE LIQUEFIER BATCH TRANSITION PROCESS

[75] Inventors: Jeffrey M. Owen, Bushey; Richard L. Herbert, Chesham Bois, both of United Kingdom; Steven D. Possanza, Penfield, N.Y.

[73] Assignee: Eastman Kodak Company, Rochester, N.Y.

[21] Appl. No.: 08/924,687

[22] Filed: Sep. 5, 1997

[51] Int. Cl.⁷ .................................................. B01F 15/06
[52] U.S. Cl. ........................................ 366/144; 366/160.3
[58] Field of Search ................................... 366/132, 134, 366/144, 145, 146, 147, 152.1, 160.1, 160.2, 160.3, 162.1, 182.1, 182.2, 348; 126/284, 343.5 R, 343.5 A; 219/421; 222/146.2, 146.4; 432/156

[56] References Cited

U.S. PATENT DOCUMENTS

| | | |
|---|---|---|
| 180,688 | 8/1876 | Whitaker . |
| 328,714 | 10/1885 | Ralston . |
| 2,217,743 | 10/1940 | Greenewalt . |
| 2,253,176 | 8/1941 | Graves . |
| 2,683,073 | 7/1954 | Pierce . |
| 2,872,296 | 2/1959 | Lemon et al. . |
| 3,032,635 | 5/1962 | Kraft . |
| 3,042,481 | 7/1962 | Coggeshall . |
| 3,178,067 | 4/1965 | Bell et al. . |
| 3,810,778 | 5/1974 | Wang . |
| 3,847,616 | 11/1974 | Kaneko et al. . |
| 4,018,426 | 4/1977 | Mertz et al. . |
| 4,272,824 | 6/1981 | Lewinger et al. . |
| 4,299,559 | 11/1981 | Shimizu et al. ......................... 432/156 |
| 4,307,705 | 12/1981 | Douglas ............................ 126/343.5 A |
| 4,308,447 | 12/1981 | Notzold et al. ........................... 219/421 |
| 4,379,836 | 4/1983 | Schnoring et al. . |
| 4,427,298 | 1/1984 | Fahy et al. . |
| 4,621,927 | 11/1986 | Hiroi . |
| 4,639,205 | 1/1987 | Lim ......................................... 366/147 |
| 4,771,920 | 9/1988 | Boccagno et al. ....................... 219/421 |
| 4,844,927 | 7/1989 | Morris, II et al. . |
| 4,976,546 | 12/1990 | Beattie . |
| 5,045,445 | 9/1991 | Schultz . |
| 5,098,194 | 3/1992 | Kuo et al. . |
| 5,098,666 | 3/1992 | Meinz . |
| 5,100,699 | 3/1992 | Roeser . |
| 5,171,089 | 12/1992 | Kuo et al. . |
| 5,182,190 | 1/1993 | LeFaou et al. . |
| 5,340,210 | 8/1994 | Patel et al. . |
| 5,374,120 | 12/1994 | Possanza et al. . |
| 5,523,537 | 6/1996 | Johannes et al. . |
| 5,814,790 | 9/1998 | Bondeson et al. ....................... 219/421 |
| 5,833,363 | 11/1998 | Gmeiner ................................. 366/147 |

Primary Examiner—Charles E. Cooley
Attorney, Agent, or Firm—Mark G Bocchetti

[57] ABSTRACT

A method and apparatus for blending consecutive batches of photographic emulsions which includes two modified passive liquefaction apparatus, each capable of independent batch melt production. Each modified liquefaction apparatus has a metering pump associated therewith to draw melt therefrom and deliver the melt to a surge pot from which the melt can be pumped to the coating operation. Each metering pump is flow controlled and the discharge lines combined to allow for static in-line mixing of the two metering pump discharges. A control system allows for regulated flow from each of the metering pumps such that the transition of drawing from the first liquefaction apparatus to the second liquefaction apparatus occurs well in advance of the exhaustion of the melt in the liquefaction apparatus. During the transition period, total flow from the first liquefaction apparatus is constantly decreased and total flow from the second liquefaction apparatus is constantly increased with total flow from the two liquefaction apparatus remaining the same. In such manner, when melt in the first liquefaction apparatus is exhausted, 100% of the flow is coming from the second liquefaction apparatus thereby providing for a smooth transition with little variation in the sensitometric parameters of the melt.

5 Claims, 4 Drawing Sheets

MODIFIED PASSIVE LIQUEFIER BATCH TRANSITION PROCESS

FIELD OF THE INVENTION

The present invention relates generally to batch liquefaction of solid materials used in the preparation of photographic emulsions and, more particularly, to processes for partially mixing sequential batches to smooth the transition from batch to batch and prevent unacceptable variations in the coated product to be produced therewith.

BACKGROUND OF THE INVENTION

Typical emulsion coating operations require liquid kettle blending to smooth batch-to-batch variability during long coating events. Conventional continuous liquefaction technology requires quick chilling, and/or pelletization, and solid blending equipment to pre-blend the emulsion in solid form. This technology is described in U.S. Pat. No. 5,182,190.

U.S. Pat. No. 5,523,537 describes a modified passive liquefaction system. In this system, a liquefying apparatus having a hopper which includes an upper and lower section is described. The upper section is adapted to receive a meltable solid material and has a coiled tube disposed therein. By heating the coiled tube, solid material supported thereon is melted and allowed to pass therethrough such that the liquefied product is stored in the lower section of the hopper and subsequently drawn off. Use of this technology with U.S. Pat. No. 5,182,190 allows one to first blend the solid material, and then passively liquefy the gelled material.

In a typical sensitizing operation for producing photographic films, "long" coatings require the use of many batches of product to produce a continuous coating. "Long" refers to the length of time required to perform the operation. A long coating in a film/paper plant can be a two to three day operation. In dedicated plants a long coating operation may last seven to ten days. It is not uncommon that the sensitometric parameters between batches are variable. If each batch is coated sequentially and in an end-to-end manner, unacceptable variations to the coated product can be produced. The variations in the sensitometric parameters of consecutive batches can result in step changes in the coated product which cannot be compensated for fast enough by a metered dye feedback system. Attempts to overcome this problem have included methods such as blending and melting, blend kettles, and modified passive liquid in-line segmented blending as is taught in U.S. Pat. No. 5,374,120. With melt/blend kettles, two or more product batches are added to the melt kettle and liquefied. The resulting homogeneous solution can then be delivered to the coating operation. By adding the same components to each subsequent melt kettle, a continuous blend is produced. Blending can also be achieved by incorporating a blend kettle with two melt kettles. The blend kettle is utilized as a reservoir with solution being supplied sequentially from the two melt kettles. These methods have the drawbacks of long melt hold time (melt drift) and significant amounts of liquefied solution (waste). Melt drift refers to a drift in the sensitometry of a melt over time. Photographic emulsions tend not to be particularly stable and as a result of liquid hold times of up to seven hours in a melt kettle, emulsion chemistry changes due to the solution temperature which, in turn, yields a change in the sensitometry.

The modified passive liquid in line segmented blender described in U.S. Pat. No. 5,374,120 is designed to blend one to four batches of product by simultaneously liquefying the batches into a surge pot. The solutions are blended within the surge pot by means of a kettle type mixer. The process achieves blending by liquefying the emulsion in each of the four quadrants. The liquefaction rate of each quadrant is roughly equal. Total liquefaction of all four quadrants is dependent on coating machine demand. Transitions are achieved in four steps of 25% each and independent solution flow rates cannot be regulated. The segmented blender requires hand loading a product into each quadrant and is labor intensive.

There remains a need for an improved melting/blending operation that eliminates sensitometric issues such as melt drift associated with melt hold, greatly reduces the amount of waste of liquefied product at any one time, and allows for bulk material handling. Further, it would be advantages to have a melting/blending system that allows for greater flexibility in the blending process.

SUMMARY OF THE INVENTION

It is, therefore, an object of the present invention to provide a method for blending sequential batches of melt which eliminates the problem of melt drift associated with melt hold.

It is a further object of present invention to provide a method for blending sequential melts for application in a coating operation which reduces the amount of liquefied product at any one time and, therefore, reduces the amount of waste.

It is a further object of the present invention to provide a method for blending sequential batches of melts which allows for a precisely controlled rate of transition from one batch melt to the next.

Still another object of the present invention is to provide a method for blending sequential melts which allows for the continuous transition from one melt to the next.

Yet another object of the present invention is to provide a method for blending sequential batches of melts which allows for the independent liquefaction of two products.

It is yet another object of the present invention to provide a method for blending sequential batches of melts which allows for the independent regulation of flow rate for each melt.

Briefly stated, these and numerous other features, objects and advantages of the present invention will become readily apparent upon a reading of the detailed description, claims and drawings set forth herein. These features, objects and advantages of the present invention are accomplished by providing a system which includes two modified passive liquefaction apparatus, each capable of independent batch melt production. Each modified liquefaction apparatus has a metering pump associated therewith to draw melt therefrom and deliver the melt to a surge pot from which the melt can be pumped to the coating operation. Each metering pump is flow controlled and the discharge lines combined to allow for static in-line mixing of the two metering pump discharges. A control system allows for regulated flow from each of the metering pumps such that the transition of drawing from the first liquefaction apparatus to the second liquefaction apparatus occurs well in advance of the exhaustion of the melt in the liquefaction apparatus. During the transition period, total flow from the first liquefaction apparatus is constantly decreased and total flow from the second liquefaction apparatus is constantly increased with total flow from the two liquefaction apparatus remaining the same. In such manner, when melt in the first liquefaction apparatus is exhausted, 100% of the flow is coming from the second liquefaction apparatus thereby providing for a smooth transition with little variation in the sensitometric parameters of the melt. This regulation of the transition allows for precise timing and control of the actual transition and controlled solution flow rates independent of melting during the transition itself. This, in turn, allows for waste to be minimized.

DETAILED DESCRIPTION OF THE INVENTION

Figure 1:
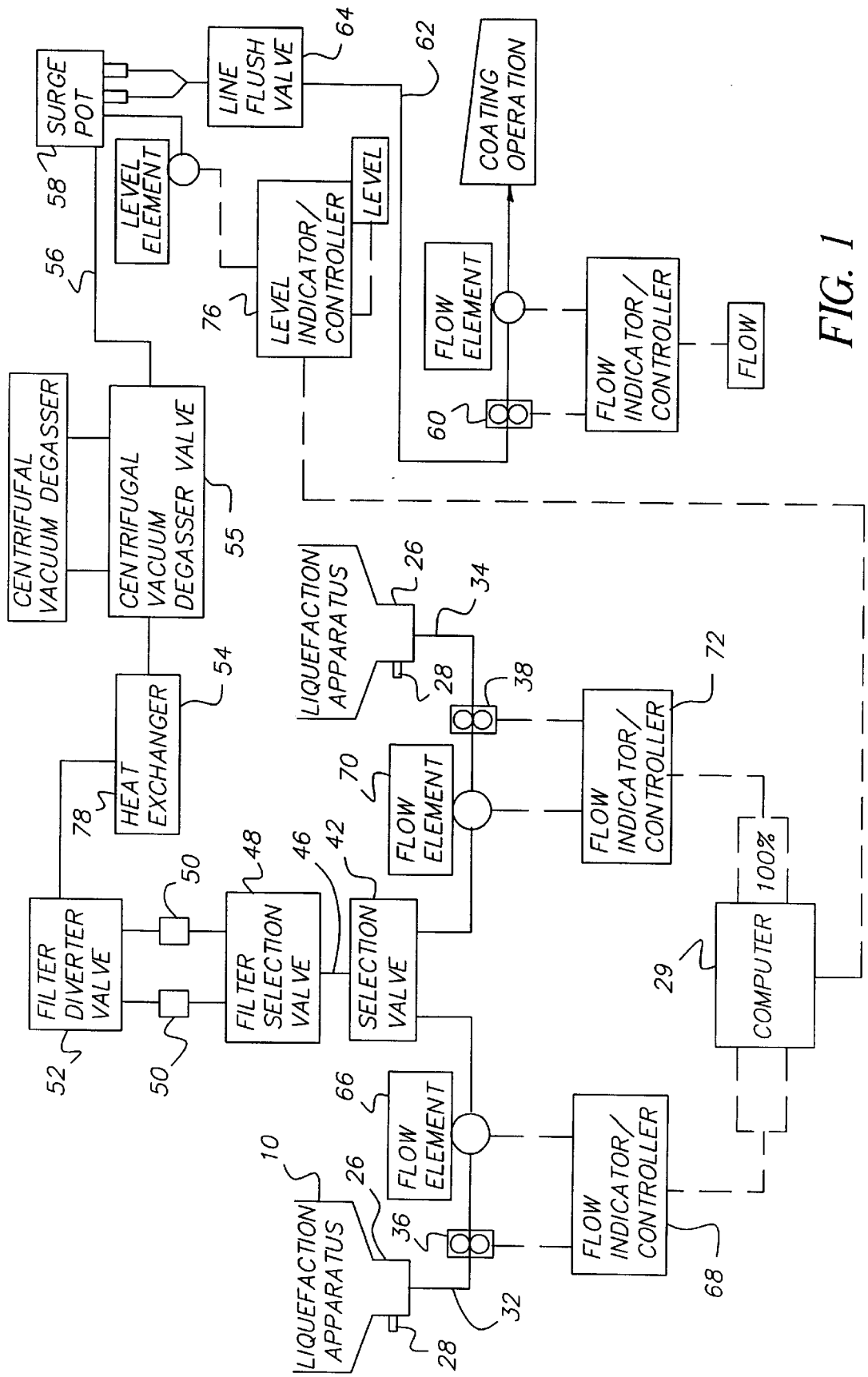
FIG. 1 is a schematic depiction of the apparatus used to practice the method of the present invention.
Figure 2:
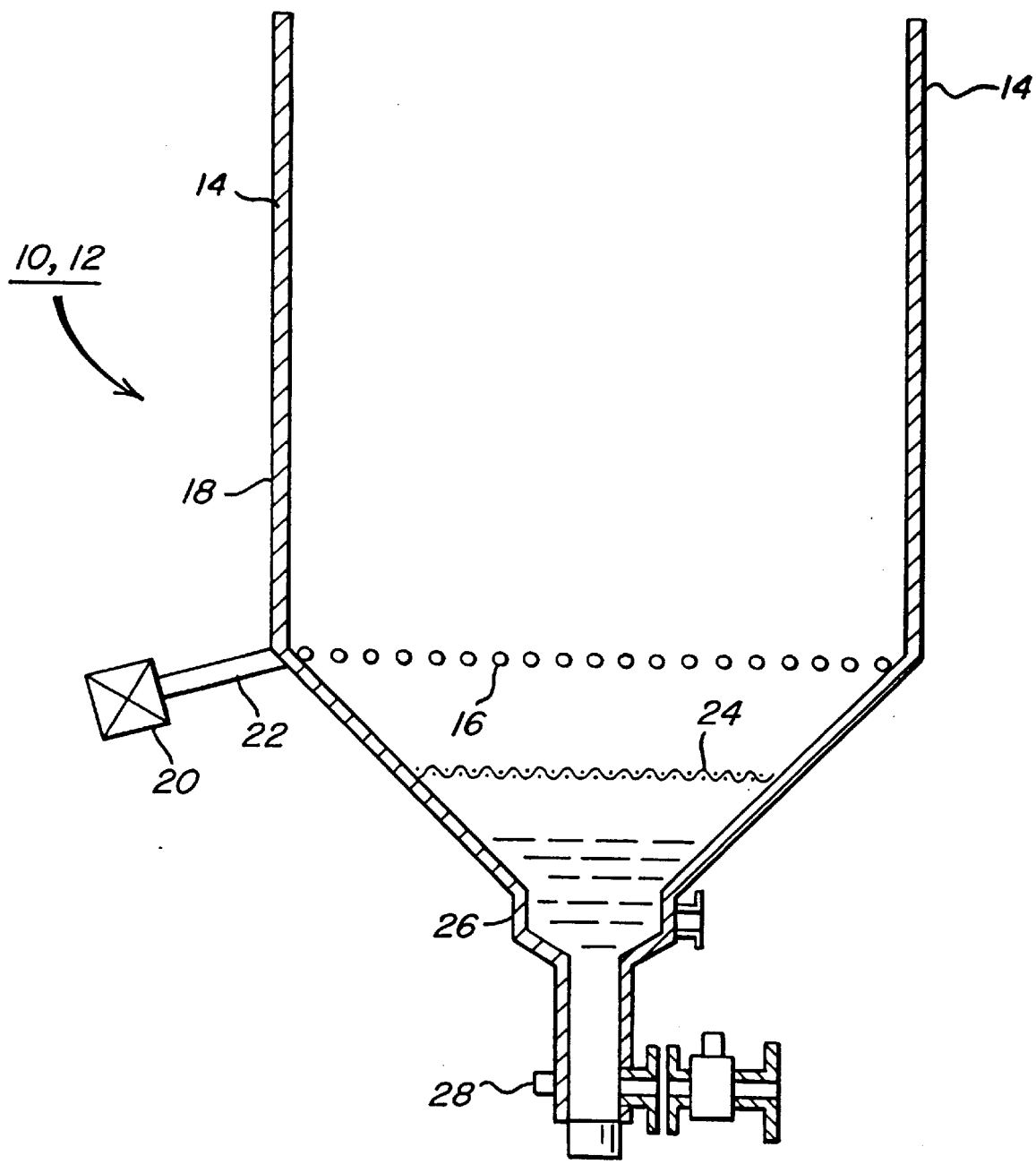
FIG. 2 is a cross-sectional view of an exemplary passive liquefaction apparatus which can be used in the practice of the present invention.

Turning first to FIG. 1 there is shown a flow schematic of the system which can be used to practice the method of the present invention. This system includes a first modified passive liquefaction apparatus 10 and a second modified passive liquefaction apparatus 12 hereinafter referred to as "first MPL 10" and "second MPL 12", respectively. Each MPL 10, 12 (see FIG. 2) includes a hopper 14 having a heating coil 16 which is disposed therein and connected to the hopper 14 in a conventional manner. The coil 16 supports solid materials such as solid chunks of aqueous gelatin, which are fed into the hopper 14. The solid materials rest on the coil 16 until they are heated by the coil 16 and transformed into a liquid state. Heating coil 16 actually consists of two or more lengths of spiral wound tubing which act to transfer heat from the heating water to the solid product and induce liquefaction. The upper portion of the hopper 14 includes vertically oriented walls 18 which prevent the solid chunks of aqueous gelatin from adhering to the wall surface.

A hot water supply (not shown) delivers hot water to heating coil 16 via valve 20 and inlet pipe 22. Hot water pumped through heating coil 16 provides the heat needed to melt the gelatin contacting heating coil 16. Liquefied gelatin drops through coil 16 into the lower portion of hopper 14. Any solid chunks of gelatin or foreign objects which might pass through coil 16 are captured on screen 24.

The lower portion of hopper 16 includes a sump 26 where liquefied gelatin is collected. Disposed in the lower section of hopper 14 is a liquid level sensor 28. The liquid level sensor 28 is used to indicate when sump 26 is full to a computer based control system 29. A high level indication from liquid level sensor 28 serves to close valve 20 to interrupt further melting of the gelatin.

There is an outlet pipe 32 from the first MPL 10 and there is an outlet pipe 34 from second MPL 12. Each outlet pipe 32, 34 actually connects to the sump portion 26 of the respective MPLs 10, 12. Outlet pipe 32 delivers liquefied gelatin via gravity to a first gear pump 36. Outlet pipe 34 delivers liquefied gelatin to the second gear pump 38 via gravity. The discharge pipe 40 from first gear pump 36 connects to MPL selection valve 42. The discharge pipe 44 from second gear pump 38 also connects to MPL selection valve 42. MPL selection valve 42 is a multi-port plug valve enabling, through operation of the computer control system 29, discharge from either the first MPL 10 or second MPL 12 to pass therethrough, or to combine such discharges into a single intermixed stream at a particular ratio.

The outlet 46 from MPL selection valve 42 connects to a filter selection valve 48. Filter selection valve 48 allows diversion of liquid flow therethrough to a selected one of two filters 50. The outlets from each of the filters 50 connect to a filter divertor valve 52. The filter selection valve 48 and the filter divertor valve 52 are used to isolate each of the two filters 50 so that one filter 50 can be purged, cleaned and/or removed without disturbing operation of the overall process. Filters 50 are preferably sized to remove particulates ranging in size from about 10 to 20 microns and greater. A pipe 54 connects filter divertor valve 52 with a centrifugal vacuum degasser valve 55 which serves to remove any remaining entrained air from the liquefied gelatin. The outlet pipe 56 from the centrifugal vacuum degasser valve 55 can deliver the liquefied gelatin to a surge pot 58. A gear pump 60 is provided in the outlet pipe 62 from surge pot 58 to pump the liquefied gelatin to the coating operation (not shown). A line flush valve 64 is provided in outlet pipe 62.

Each of the gear pumps 36, 38 are positive displacement pumps. As such, gear pumps 36, 38 are used to regulate and control the flow of solution from their respective MPLs 10, 12. There is a flow element 66 in the discharge pipe 40 from first gear pump 36. Flow element 66 sends a signal to flow indicator controller 68 which serves to control pump 36. Similarly, there is a flow element 70 in discharge line 44 of gear pump 38. Flow element 70 sends a signal to flow indicator controller 72 which serves to control gear pump 38. The computer 29 is connected to both flow indicator controllers 68,72. Computer 29, through operation of software, controls the percentage of flow from each of the gear pumps 36, 38 and ensures that the combined flow, that is the total flow from both gear pumps 36, 38 remains the same. The system of the present invention also includes a level indicator/controller 76 in surge pot 58 which signals the computer 29.

As mentioned above, flow elements 66, 70, which may be either mass or volumetric type flow elements, are used to measure the solution flow rate and control the solution flow rate in a flow loop with their respective gear pumps 36, 38. During steady state operation, only one flow indicator/controller 68, 72 receives a flow signal. The flow signal is based on the level in surge pot 58 and, in general, matches demand for the coating operation downstream. During transition from the first MPL 10 to the second MPL 12, or vice versa, the total flow from both gear pumps 36, 38 as controlled by flow indicator/controllers 68, 72 equals the coat flow in the downstream operation.

In coating with photographic emulsions, if batches thereof are truly sensitometrically invariant, then there would be no need to worry about changes from batch to batch. However, as a practical matter, there will likely be some sensitometric differences from batch to batch. Through operation of method and apparatus of the present invention, there is a gradual change over from the expiring MPL to the new MPL. This is called transitioning. The gradual change is carefully controlled so that any sensitometric differences between the respective MPL contents will be spread over a period long enough to allow continuous sensitometric adjustment during the coating operation.

The sensitometric variability (particularly emulsion speed) between batches can be assessed prior to coating. However, there is a degree of uncertainty involved in the measurement of the sensitometric parameters. Batches within the sensitometric acceptance level should not need transitioning but due to the uncertainty of measurement of the sensitometric parameters, batches have to be processed, that is smoothed, as if there is a large difference from batch to batch.

When in operation, each MPL 10, 12 continuously melts the solid gelatin using hot water coil set at 130° F. As soon as the product liquefies around the heating coil 16, the liquefied product drops away from the heat source to collect in the sump 26. The temperature in the sump 26 may vary with flow demand but should be close to about 110° F. To maintain this temperature and to correct for variations caused by demand changes, an in-line active heat exchanger 78 is used.

To ensure a good operational understanding of the run out times for MPLs 10, 12 and to enable the swings and transitions to be efficient, the MPLs 10, 12 are set on weigh scales (not shown). Each MPL 10, 12 is calibrated to the same weight so that at each stage of operation, the actual contents can be established. Transitioning automatically starts on the weight on the "old" or spent MPL 10, 12. This should include a small contingent weight. Initial flow for the "new" MPL 10, 12 is preferably set at 50 cc/min. for three minutes before ramping starts. By "ramping" what is meant is the gradual increase in flow from the new MPL 10, 12 and the gradual decrease in flow from the old MPL 10, 12. Preferably, after three minutes of flow at 50 cc/min., the flow rate from the "new" MPL 10, 12 will change to 5% of the total coat flow and then start the transition rate. If 5% of the coat flow is less than 50 cc/min., the gear pump 36, 38 for the "new" MPL 10, 12 will run at 50 cc/min. until that point in time is reached on the transition curve where flow demand from the new MPL 10, 12 reaches 50 cc/min. Ramping will then commence.

A swing between MPLs 10, 12 is made when the contents of both MPLs 10, 12 are from the same batch. No transitioning is needed when the contents of the of both MPLs are from the same batch. Typically one batch will fill multiple MPLs 10, 12. A transition in accordance with the method of the present invention is made when the contents of each of the MPLs 10, 12 are not from the same batch of photographic emulsion.

During a three hour transition as in the example below, ramp rate changes depend on the coating machine conditions but preferably are based on a rate not faster than about 0.56 percent per minute for the transition period. Flow from the old MPL 10, 12 preferably ramps down until approximately 12 kg remain. The ramping then stops and flow continues at a constant rate. The remaining solid in the old MPL 10, 12 is liquefied. The flow then continues to ramp down until approximately one (1) liter remains and the transitioning operation stops. As the flow from the old MPL 10, 12 ramps downwardly, flow from the new MPL 10, 12 ramps upwardly such that the combined flow rate from the two MPLs 10, 12 remains generally constant. The flows from the MPLs 10, 12 are controlled by the level in the surge pot 58 and will vary with coating apparatus demands as well as with surge pot 58 upsets caused by, for example, by swings between filters 50. To overcome problems of varying flow demands when both MPLs 10, 12 are in use, a form of ratio control is used on the gear pumps 36, 38. The ratio of the expiring MPL 10, 12 flow change from 95% to 5% from the start to the finish of the transitioning operation while, in turn, the ratio of the new MPL 10, 12 will change from 5% to 95% during that same period of time. Of course, prior to and at the completion of the transitioning operation the flow rate ratio from one of the MPLs 10, 12 will be 100%. To ensure good flow control at very low flow rates such as, for example, during coating apparatus delays, a minimum flow rate for either gear pump 36, 38 should be set so that if the demand goes below that minimum flow rate for either gear pump 36, 38, then both gear pumps 36, 38 will be stopped to thereby maintain the ratio between the two gear pumps 36, 38. The change in ratio between the two MPLs 10, 12 is calculated as a ramp rate. This ramp rate can be varied and is generally determined by the sensitometric offset between emulsion batches and the ability of downstream operations to correct for the change. In practice, this dictates that the minimum time for the changeover or transition period. Normally, the actual period of transition will be longer than this because of coating machine stoppages. Coating machine stoppages change the overall flow demand from the two MPLs 10, 12 which affects the volume of liquefied gelatin used. This, therefore, adjusts the ramp rate down so that the ramp period finishes with minimum waste.

Figure 3:
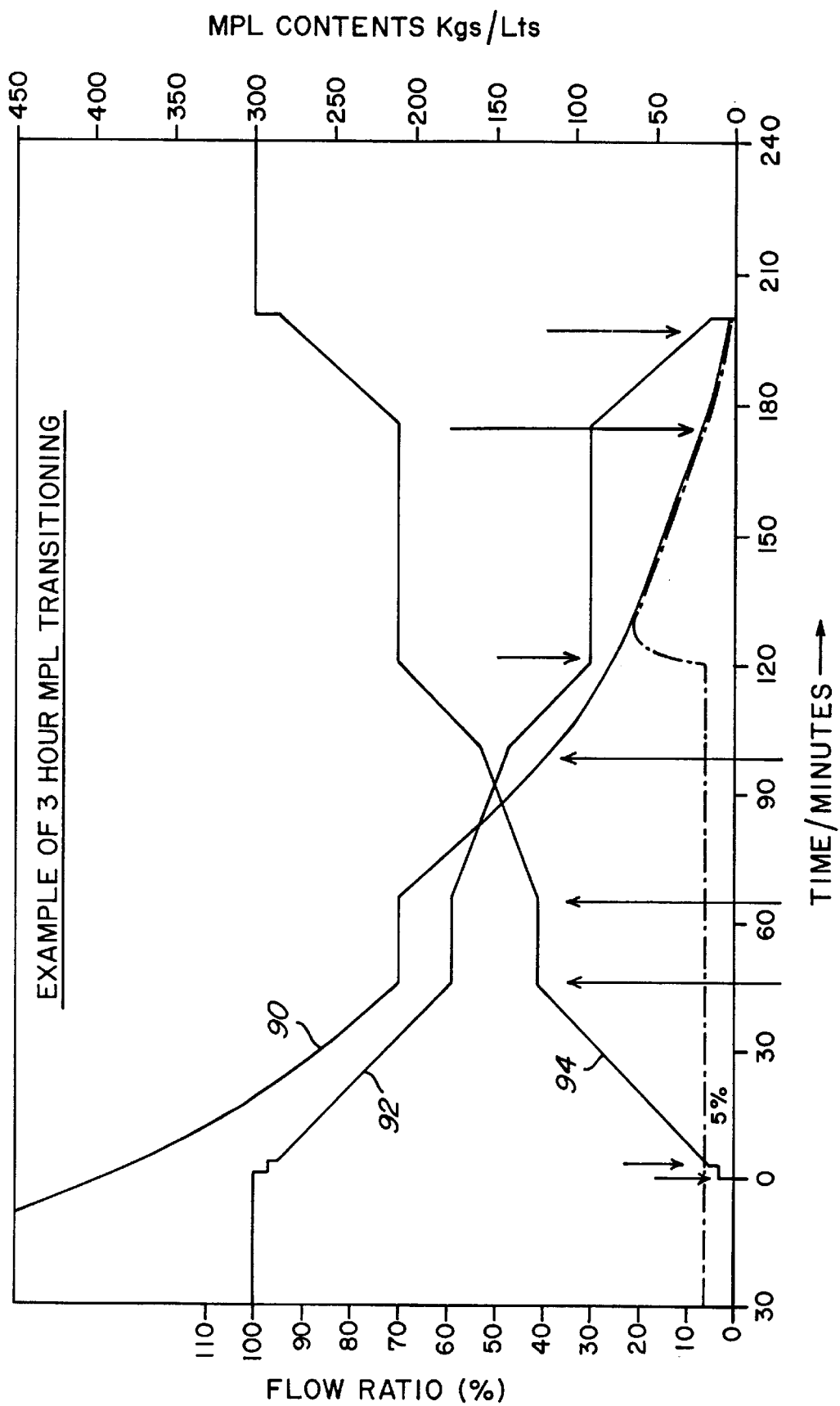
FIG. 3 is a graph which depicts an example of the transition operation using a two hour minimum ramp rate.

An example of a transition operation using a three hour minimum ramp rate is graphically depicted in FIG. 3. The example depicted in FIG. 3 shows a transition operation where flow is being supplied to two coating machines with coating interruptions occurring. Curve 90 plots the weight of the contents of the old MPL versus time. Curve 92 plots the flow ratio from the old MPL versus time. Curve 94 plots the flow ratio from the new MPL versus time. Prior to the zero time reference 100% of flow is supplied from the old MPL. At the zero time reference flow from the new MPL is started at a rate of 50 ml/min and flow from the old MPL is decreased by 50 ml/min. At about the three minute time reference, ramping of both MPLs begins. At about the 45 minute time reference an interruption occurs with both coating machines. With zero demand ramping stops and both pumps 36, 38 go to low flow operation. In low flow operation pump 60 preferably drops to a rate of about 0.1 liters per minute and pumps 36, 38 drop to a respective rates which meet that demand. At the 60 minute time reference one of the coating machine comes back on line and ramping continues. However, note that because flow demand is only half of that required for to coating machines, the ramp rate becomes about one-half of the original ramp rate. At about the 100 minute time reference both coating machines are back in operation and demand is back to 100%. At about the 120 minute time reference ramping is halted while 100% flow continues. The remaining solid in the old MPL is melted allowing for a determination of the of the volume of material remaining in the old MPL. This is the ramping restart volume (SRR). With that volume known ramping is continued until, preferably, the flow rate ratio from the old MPL is less than 5% or the content of the old MPL is about 1 liter or less. At about the 200 minute time reference, the transition has been completed. Flow from the old MPL is halted and flow from the new MPL is 100% of demand.

Near the end of each transitioning operation, the level set point in the sump 26 is raised so that the liquid volume is increased therein. This procedure is also used at the start-up at each MPL 10, 12 to increase liquid volume and, therefore, thermal stability. Near the end of the transitioning operation, the residual MPL contents are liquefied so that the end point can be more accurately assessed. The end point is preferably assessed by volume because the load cells used for the scales under each MPL 10, 12 may not be accurate enough to determine the remaining amount of material. Therefore, the remaining solid is melted and the liquid level in sump 26 is used to calculate the volume of the remaining material. With the volume of the remaining material and the current rate known, the time required to empty the expiring MPL 10, 12 can be determined. Pumping from the expiring MPL 10, 12 continues until the expiring MPL is substantially empty or exhausted. An MPL 10, 12 is "substantially empty" or "substantially exhausted" when the volume of material remaining therein is not more than about 10 liters.

Figure 4:
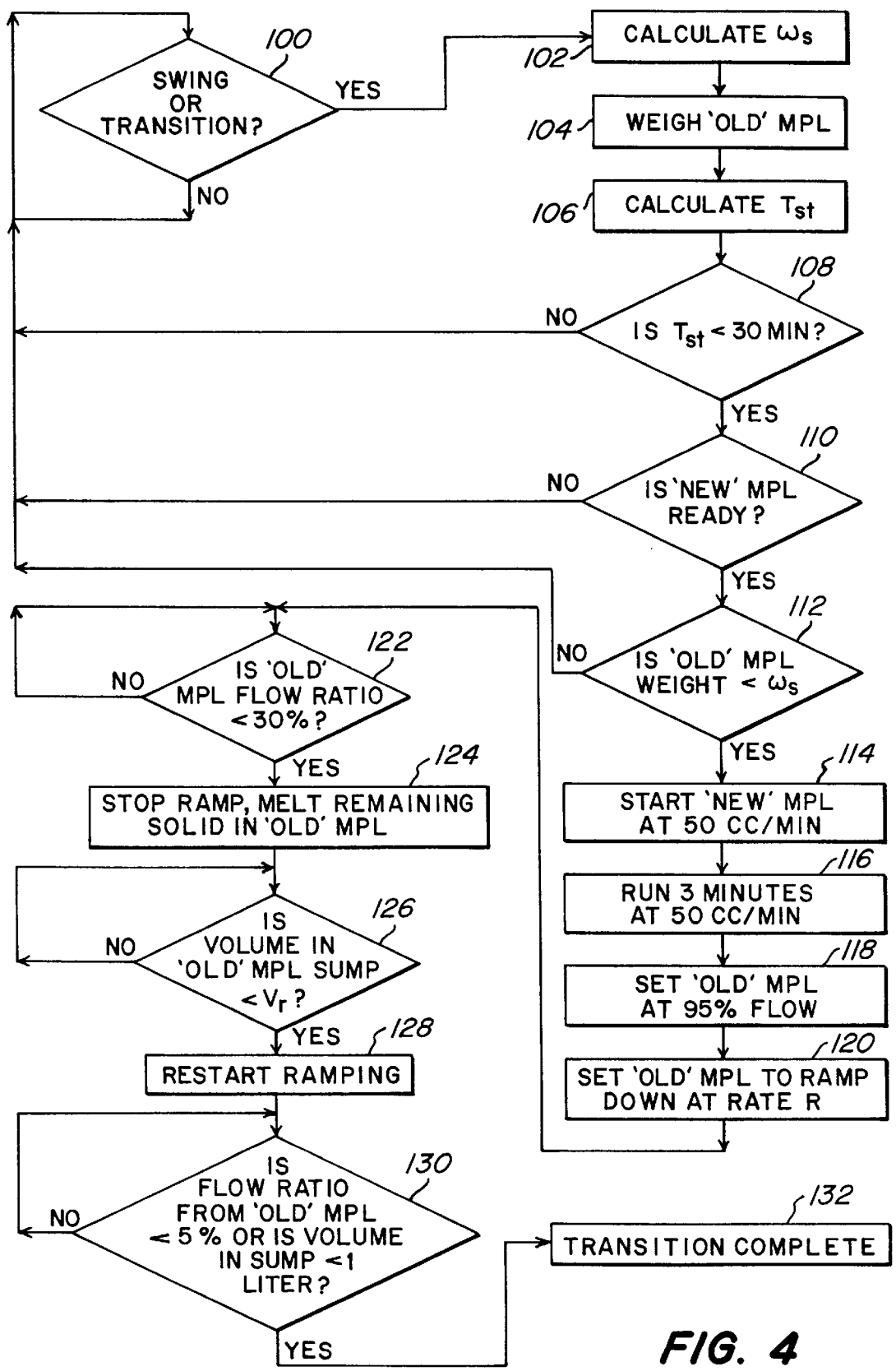
FIG. 4 is a logic diagram for batch transitioning control between liquefaction apparatus in order to practice the transition operation of the present invention.

Turning next to FIG. 4, there is shown a flow diagram for the process logic used in batch transitioning between MPLs 10, 12. This logic diagram describes the start of the transition sequence and the mid-transition adjustment. During a transition operation the actual ramp rate will change depending on the actual coating apparatus conditions. As can be seen from decision box 100, computer 29 must first be informed whether the next operation between MPLs 10, 12 is a transition as opposed to a swing. This requires operator input in the form of, for example, a switch which the operator can set to swing or transition. If the answer is yes, per function box 102 the computer calculates the transition start weight ($W_s$). If the answer is no then logic recycles back to decision box 100 and this recycling continues until the answer is yes. After the transition start weight has been calculated, the weight of the contents of the old MPL 10, 12 is measured per function box 104 and the transition start time ($T_{st}$) is calculated per function box 106. Per decision box 108, the computer then determines if the transition start time is less than 30 minutes. If the answer is no the logic again recycles back to decision box 100. If the answer is yes the computer asks if the new MPL 10, 12 is ready to begin a transition operation as indicated by decision box 110. If the answer is no then preferably an alarm is sounded to notify the operator to prepare the new MPL 10, 12. Per decision box 112, the computer then determines if the weight of the contents of the old MPL 10, 12 is less than the transition start weight ($W_s$) If the answer is no the logic again recycles back to decision box 100. If the answer is yes then the transition process of the present invention is begun. When the answer to decision box 112 is yes, then flow from pump 36, 38 of the new MPL 10, 12 is started at a rate of 50 ml/min as indicated by function box 114. Per function box 116 the low flow rate of 50 ml/min is continued for three minutes. Then, per function box 118, flow from the pump 36, 38 of the old MPL IO is reduced to 95% of the total flow and flow from the pump 36, 38 of the new MPL 10, 12 is increased to 5% of the total flow. Pumps 36, 38 are then controlled (per function box 120) so that flow from the old MPL 10, 12 ramps down at a rate percent per minute (R) and the flow from the new MPL 10, 12 ramps up at the same rate (R). The computer then determines when the flow ratio from the old MPL 10, 12 is less than 30% of the total flow as indicated by decision box 122. If the answer is no then logic continues to ask this question until the answer is yes. When the answer to decision box 122 is yes then, per function box 124, ramping of the flow rate from pumps 36, 38 is halted with 100% flow continued at the then current flow rate ratio. The remaining solid within the old MPL 10, 12 are melted at this time. With the remaining contents of the old MPL 10, 12 now residing in the sump 26, the computer then determines whether the volume in sump 26 is less than the ramping restart volume ($V_r$) as indicated by decision box 126. If the answer is no then the flow logic continues to ask this question until the answer is yes. If the answer is yes then ramping of the flow rates from pumps 36, 38 is restarted at the same ramping rate (R) as indicated by function box 128. The computer then determines (per decision box 130) if the flow ratio from the old MPL 10, 12 is less than 5%, or if the volume in sump 26 is less than one liter. If the answer to either of these questions is no then the flow logic continues to ask this question until the answer is yes. When the answer is yes then per function box 132 the transition is completed.

Flow from the old MPL 10, 12 is at zero and flow from the new MPL 10, 12 is at 100%. The following example shows the calculation of the weight of material in the exhausted MPL 10, 12 when the transition operation from batch to batch should begin. This is the transition start weight ($W_s$), the example also shows the calculation for the time until the transition operation should begin. This is the transition start time ($T_{st}$). The example further shows the calculation for the current ramp rate of change (R) and the second critical volume in the sump 26 at which the transition should restart. This second critical volume is referred to as the ramping restart volume ($V_r$). The current flow rate ratio (r) of the old MPL begins at 95% and is adjusted downward by each iterative calculation of the the current ramp rate of change (R). Although the equation given below allows for two coating apparatus ($C_1$ and $C_2$) to be supplied by the batch blending method of the present invention, the example assumes a single coating apparatus is being supplied. Thus, the values inserted into the equations for the second coating machine are zero. The example further assumes an aim flow rate ($F_{aim}$) to the coating apparatus of 2.0 l/min., an actual flow rate ($F_{act}$) of 0.1 l/min to the coating apparatus, a transition time (T) of 180 min., and a specific gravity ($S_g$) of the coating liquid of 1.1 kg/l. Because of potential inaccuracies in weighing an MPL, a factor of 1.03 is applied for the purpose of ensuring that the old MPL is not pumped completely dry which could result in damage to pumps 36, 38.

$$W_s = \frac{[(C_1 F_{aim} + C_2 F_{aim}) * T * S_g * 1.03]}{2} =$$

$$\frac{[2 \text{ l/min} + 0) * 180 \text{ min} * 1.1 \text{ kg/l} * 1.03]}{2} = 204 \text{ kg}$$

$$T_{st} = \frac{(\text{Current MPL weight}) - W_s}{(C_1 F_r + C_2 F_r) * S_g} = \frac{(550 \text{ kg}) - (204 \text{ kg})}{2 \text{ l/min} * 1.1 \text{ kg/l}} = 157 \text{ min}$$

$$R = \frac{(C_1 F_{act} + C_2 F_{act}) * 100}{(C_1 F_{aim} + C_2 F_{aim}) * T} =$$

$$\frac{(0.1 \text{ l/min} + 0) * 100}{(2 \text{ l/min} + 0) * 180 \text{ min}} = 0.02 \text{ percent of flow per minute}$$

$$V_r = \frac{(C_1 F_{aim} + C_2 F_{aim}) * T * r^2 + 1}{2} =$$

$$\frac{(2 \text{ l/min} + 0) * 180 \text{ min} * 0.30^2 + 1}{2} = 17 \text{ liters}$$

where r is the current flow rate ratio from the old MPL.

Typically, the transition time will be about 180 minutes and the start weight for each MPL is in the range of from about 500 kg to about 600 kg.

Using the process and apparatus of the present invention, batch transition is efficiently accomplished. Sensitometric issues such as melt drift associated with melt hold in conventional melting/blending operations are eliminated. Further, the amount of liquefied product at any one time is greatly reduced which results in a concomitant reduction in waste. Through practice of the present invention, independent liquefaction of two products is accomplished with a precisely controlled rate of transition from one product to the next. The time to complete this controlled transition from one product to the next is independent of the melting rates of the individual products.

Although the ramp rate of change (R) is described herein as being continuous, it should be appreciated that the ramp rate is a function of the frequency at which computer makes adjustments to the flow ratio. This calculation can be made, for example, once every second, once every 10 seconds, or once every minute. As such "continuous ramping" as used herein is intended to include a series of step changes to the ramp rate.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for blending batches of melted solids comprising the steps of:
   (a) delivering a first batch of solid material having a known quantity to a first liquefaction apparatus;
   (b) delivering a second batch of solid material having a known quantity to a second liquefaction apparatus;
   (c) melting the first batch over a period of time;
   (d) pumping the melted portion of the first batch to a surge pot at a predetermined rate until there is a predetermined remainder of the first batch remaining in the first liquefaction apparatus;
   (e) reducing the predetermined rate at which the first batch is pumped by a predetermined amount;
   (f) beginning to melt the second batch of solid material;
   (g) pumping a melted portion of the second batch to the surge pot at a rate equal to the predetermined amount to thereby result in a combined flow which is equal to the predetermined rate;
   (h) ramping up the pumping rate from the second liquefaction apparatus while simultaneously ramping down the pumping rate from the first liquefaction apparatus; and
   (i) maintaining the combined flow rate to equal the predetermined rate during said ramping step.

2. A method as recited in claim 1 further comprising the steps of:
   (a) holding the pumping rates from the first and second liquefaction apparatus when a predetermined ratio has been reached;
   (b) liquefying the remaining solid material of the first batch; and
   (c) continuing to ramp up the pumping rate from the second liquefaction apparatus while simultaneously continuing to ramp down the pumping rate from the first liquefaction apparatus until the first liquefaction apparatus is substantially empty.

3. A method for blending batches of melted solids comprising the steps of:
   (a) melting a first batch of solid material having a known quantity over a period of time, the first batch being contained within a first liquefaction apparatus;
   (b) pumping melted material of the first batch to a surge pot at a predetermined rate until there is a predetermined remainder of the first batch remaining in the first liquefaction apparatus;
   (c) reducing the predetermined rate at which the first batch is pumped by a predetermined amount;
   (d) beginning to melt a second batch of solid material having a known quantity, the second batch being contained within a second liquefaction apparatus;
   (e) pumping melted material of the second batch to the surge pot at a rate equal to the predetermined amount to thereby result in a combined flow which is equal to the predetermined rate;
   (f) ramping up the pumping rate from the second liquefaction apparatus while simultaneously ramping down the pumping rate from the first liquefaction apparatus; and
   (g) maintaining the combined flow rate to equal the predetermined rate during said ramping step.

4. A method as recited in claim 3 further comprising the steps of:
   (a) continuing said ramping steps until the first batch of solid material in the first liquefaction apparatus is substantially exhausted;
   (b) discontinuing pumping of melted material from the first liquefaction apparatus; and
   (c) pumping the melted material from the second liquefaction apparatus to the surge pot at the predetermined rate.

5. A method as recited in claim 4 further comprising the steps of:
   (a) holding the pumping rates from the first and second liquefaction apparatus when a predetermined ratio has been reached;
   (b) liquefying the remaining solid material of the first batch; and
   (c) continuing to ramp up the pumping rate from the second liquefaction apparatus while simultaneously continuing to ramp down the pumping rate from the first liquefaction apparatus until the first liquefaction apparatus is substantially empty.

* * * * *